United States Patent Office 3,201,256
Patented Aug. 17, 1965

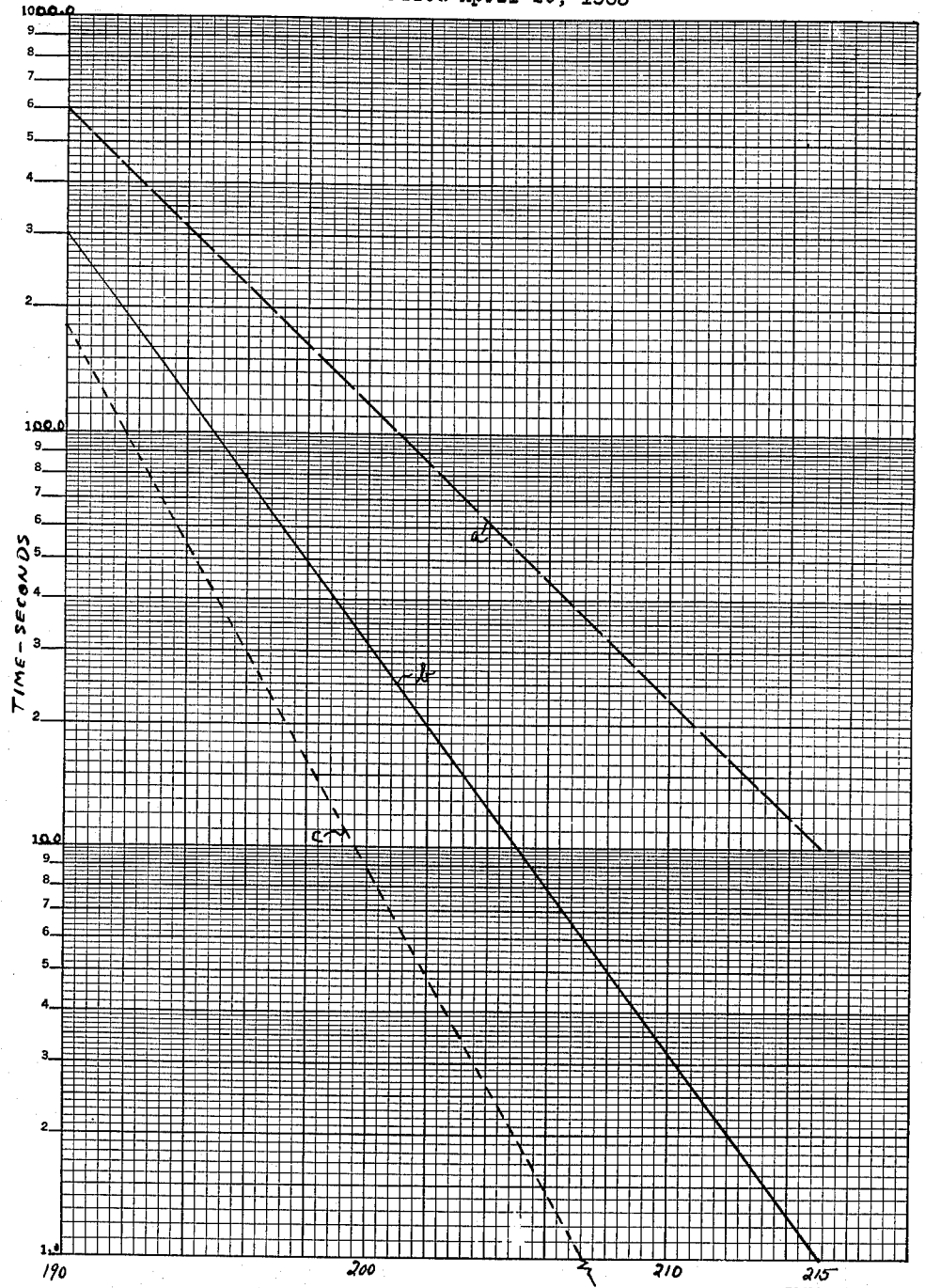

3,201,256
METHOD OF PREPARING LIQUID
INFANT FORMULA
Robert E. Clark and Elmer R. Eckhardt, Lansing, and John B. Hassinen and Rexford C. Stribley, Mason, Mich., assignors to American Home Products Corporation, New York, N.Y., a corporation of Delaware
Filed Apr. 10, 1963, Ser. No. 271,982
10 Claims. (Cl. 99—63)

This invention relates to a method of preparing a liquid infant formula. More particularly, this invention relates to improvements in the pretreatment of the non-fat milk utilized in the preparation of a substitute human milk formulation.

Considerable effort has been directed in recent years to compounding and producing milk based infant feeding products having the same chemical and physical characteristics as those of human milk. One of the major problems in producing a substitute human milk has been the processing of the various components utilized, in such a way that when the components are blended into the final product, it will have substantially the same characteristics and behavior as that of human milk. To this end, rigid standards are set to insure that the components being included in such formulae contribute to the final product all the desired characteristics.

The present invention concerns the formulation of products of this type wherein there is normally combined with the milk component or components an edible fat, edible lactose and the necessary vitamins and minerals in varying amounts as desired. The quantity of vitamins and minerals added will depend on the milk sources used and the manner in which the milk is processed before being considered suitable for blending into the infant formula. Experience has shown that certain types of milks derived from bovine or other milk sources such as for example goat's milk if properly processed, can be utilized as satisfactory components in a simulated human milk formula. A typical example of a composition of this type is that described in U.S. 2,604,403. The composition described therein is based on the use of electrodialyzed whey, prepared in a manner that results in the whey having very specific characteristics and content. It has been found that a product of the type such as for example is described in Example XI of the subject patent is a most suitable human milk substitute. Such a composition is prepared from skim milk together with electrodialyzed whey, a fat component and minor quantities of other ingredients primarily vitamins and minerals identified.

In attempting to blend these specific components, i.e., skim milk, electrodialyzed whey, a fat blend and edible lactose into a satisfactory commercial liquid product that has the required physical characteristics of color, odor and shelf life as well as the nutritional characteristics required, considerable difficulty has been experienced. While the components identified could under certain circumstances be combined to produce a liquid product which could be heat sterilized in cans without graininess and coagulation, more often than not, particularly in volume production such as on a commercial scale, no such product could consistently be prepared. Since sterilization of the liquid product after blending is required, the coagulation of the product as a result of this treatment is most undesirable because the product is not commercially suitable.

It is accordingly an object of the present invention to improve the method of preparing liquid infant formula.

It is a further object of the present invention to provide a method which would result in the production of a stable liquid infant formula having a long shelf life and capable of "in can" sterilization without coagulation.

It is a still further object of the present invention to provide a method by which the essential components of an infant formula on blending into a liquid product would have physical characteristics of color, odor and taste substantially similar to that of human milk.

These and other objects and advantages are now possible according to the method of the present invention which in its broadest aspect is directed to the pretreating of the skim milk component of an infant liquid feeding formula under specific conditions prior to combining the skim milk with the other major ingredients of the formula, primarily the electrodialyzed whey. It has been found quite unexpectedly according to the present invention that if the non-fat milk component, i.e., the skim milk portion of the infant formula described, is first heated to a temperature of from 190° F. to about 215° F. and maintained at this temperature for a period of time depending on temperature used of from about 0.1 second to about 10 minutes prior to blending the same with the electrodialyzed whey, liquid infant formula is produced which can be subjected to "in can" sterilization without coagulation or graininess resulting.

The foregoing result of obtaining a liquid product which can be heat sterilized "in cans" without producing a graininess in the liquid product or more importantly in producing a product which does not coagulate during sterilization is a substantial step forward in the production of infant formulas of this type. As has been previously described, experience has demonstrated that it is most difficult to obtain a stable liquid infant product which will have all the essential nutritional characteristics and can be heat sterilized without the unsatisfactory characteristics of graininess and coagulation previously referred to.

The heat treatment of milk before evaporation in the preparation of American Standard evaporated milk and similar products is described in the literature as "forewarming." However the heat treatment of skim milk to be combined with major quantities of fat, added carbohydrate and most importantly and critically, electrodialyzed whey to yield a human milk substitute which can be consistently sterilized and which will have satisfactory physical properties and shelf life, is a unique and heretofore unsolved problem. For such a product the critical heat treatment as described must be applied to the skim milk alone prior to combining it with the other formula ingredients. Any similar treatment of the combined ingredients or formula mix does not have the desired effect, and in fact has a destabilizing effect. This marked reversal of effect on formula stability between heating of the skim milk alone and that of the same treatment of this milk in the presence of the other described ingredients is quite specific and unexpected.

An additional and important feature of the present invention is the discovery that if the non-fat milk component is heat treated under the conditions described above the non-fat milk may, on cooling, be spray dried and stored for future use without further stabilization or treatment of any kind. This added advantage, permitting the heat treated non-fat skim milk to be stored for substantial periods of time without degredation or other undesirable changes such as changes in color, odor or taste is of considerable importance. It has been found that even after a considerable length of storage time a non-fat skim milk, treated under conditions described, can be removed from storage and formulated with electrodialyzed whey in the manner described in the examples which follow, to produce a most satisfactory liquid infant feeding formula which can also be "in can" sterilized without heat induced graininess or coagulation of the final product.

The reason for this unique and most desirable accomplishment is not clearly understood. The rapid heating of the non-fat milk to the specified temperature of from 190° F. to 215° F. and the maintaining of this temperature for a period of from 0.1 second to 10 minutes in the manner described below is believed to result in a modification of the protein component which permits it to withstand the high sterilization temperature normally from 240° F. to about 300° F. The rapid heating described if carried out within the conditions hereinafter set forth does not adversely affect the characteristics of the final product in which it is used either from an appearance aspect or from the view of its behavior and functioning as a suitable infant feed.

While the time-temperature relationship necessary to accomplish the objects of the present invention has been broadly set forth as a temperature of from 190° F. to 215° F. during the heating period of from 0.1 second to about 10 minutes, reference is to be made to FIGURE 1 wherein the specific time-temperature relationship necessary to effect the result desired herein is more precisely defined. Referring now to FIGURE 1, lines $a$ and $c$ represent the upper and lower limits respectively of the heating time suitable for temperature of operation within the critical range defined. The line $b$ establishes a preferred time-temperature relationship which provides the most satisfactory product. It will be noted that the optimum preheat (line $b$) with the temperature limit of 190° F. and 215° F. varies inversely with temperature between 1.0 second and 300 seconds. When heating of the skim milk is carried out at 190° F., a time of from about 180 seconds to 600 seconds may be used with a time of about 300 seconds being preferred to provide consistent and most satisfactory results. Similarly, when a preheat temperature of 215° F. is used, the holding time may be varied from about 0.1 second to about 10 seconds with a time of about 1.0 second providing the optimum results. Further reference to FIGURE 1 provides other time-temperature relationships which will provide the product desired depending on the relationship of the selected time-temperature to the lines established in FIGURE 1.

The compositions in which the pretreated non-fat milk of the present invention are used are described more specifically in the examples which follow. In the broadest aspect, the composition is obtained by blending together, measured amounts of preheated skim milk, electrodialyzed whey, edible lactose and a fat blend. The fat blend normally will be blends of animal and/or vegetable fats. A suitable blend would include for example a major amount of oleo oil together with lesser but about equal amounts of coconut oil, corn oil, soya bean oil or the like. In the examples which follow, the described blend of fat was normally used, through other blends known in the art will serve equally as well.

Reference now to the examples which follow, in which liquid infant feeds are prepared utilizing a non-fat milk treated in accordance with the present invention will provide a better understanding of the present invention and of the operating limits defined in FIG. 1. It will be noted that in the examples, wherein the non-fat milk component was pretreated under conditions other than those required by the present invention, that an unsatsfactory product was obtained. On the other hand in those exmaples in which the non-fat milk was pretreated according to the method of the present invention, a very satisfactory product is obtained, most suitable as a substitute for human milk as an infant feeding composition and capable of being "in can" sterilized as described without the undesirable effects which have normally resulted from such processing in the conventional manner.

EXAMPLE I

A weighed portion of non-fat milk, sufficient for laboratory scale operation, was heated to 200° F. in a steam jacketed heating kettle, equipped with a motor driven stirrer. Agitation was sufficient to keep the entire quantity of milk in a thoroughly mixed condition. The milk was heated rapidly to 200° F. and when the temperature was attained the heat was reduced to maintain the temperature for 30 seconds. The milk was thereafter immediately cooled by addition of the other formula ingredients, namely electrodialyzed whey, a fat blend, lactose and minerals, all of which were added at a mix temperature of about 135° F. After all ingredients were added in the proper proportion, the total mixture was then heated to 165° F., homogenized and sterilized at a temperature of 265° F. See table below for summary of results.

EXAMPLE II

Another portion of non-fat milk was heated to 150° F. in a manner identical to the procedure in Example 1. After holding the milk at 150° F. for 30 seconds, the remaining ingredients above described were added in the same quantity and at the same temperature. After homogenization and sterilization, the viscosities were determined. The results are reported below.

TABLE

| Skim Milk Preheat Condition | Viscosity, cps. | Physical Condition |
|---|---|---|
| Example I—200° F. | 10.7 | Smooth. |
| Example II—150° F. | (¹) | Coagulated. |

¹ Not measurable.

EXAMPLE III

Separate weighed portions of non-fat milk were heated to 175° F. in a manner identical to procedure in Example I and then cooled. Each of the portions of milk then were combined with the other formula ingredients, namely electrordialyzed whey, fat blend, lactose, and minerals, all of which were added at a temperature of about 135° F. After all ingredients were added in proper proportion in each batch, the total mixtures were heated to 165° F., homogenized, canned and sterilized at a temperature of 265° F. After sterilization, cans were examined for viscosity and physical characteristics. All cans of the formula were either coagulated or of extremely high and unacceptable viscosity and severe graininess.

The above results demonstrate that preheating the non-fat milk to a temperature less than 190° F., regardless of holding time at temperature, results in an unsatisfactory product after being sterilized.

EXAMPLE IV

Separate weighed portions of non-fat milk were heated as follows: (1) 200° F., about 5 seconds holding time, (2) 200° F., with 2.0 minutes holding time, (3) 210° F., with 2.0 minutes holding time, (4) 220° F., with a 5 second hold. Each of these preheated non-fat milk samples, after cooling, were combined with the other formula ingredients, namely electrodialyzed whey, fat blend, lactose and minerals. After all ingredients were added in proper proportion in each batch, the formula mixtures were heated to 165° F., homogenized, and sterilized at a temperature of 265° F. After sterilization, cans were examined for viscosity and physical characteristics. Results follows:

| Skim Milk Preheat Condition | Viscosity, cps. | Physical Condition |
|---|---|---|
| (1) 200° F., 5 second holding | 7.5 | Smooth. |
| (2) 200° F., 2.0 minutes holding | 13.0 | Do. |
| (3) 210° F., 2.0 minutes holding | 13.0 | Grainy. |
| (4) 220° F., 5 second holding | (¹) | Coagulated. |

¹ Not measurable.

The above results establish the upper temperature limit for preheat of the non-fat milk at a point between 210° F. with about 2.0 minutes holding time at temperature and 220° F. flash heated or with no holding time, namely about 215° F.

EXAMPLE V

Separate weighed portions of non-fat milk were heated as follows: (1) 190° F., about 5 seconds holding time, (2) 190° F., 30 seconds holding time, (3) 190° F., 2.5 minutes holding time, (4) 190° F., 5.0 minutes holding time. Each of these preheated milk samples, after cooling, were combined with the other formula ingredients, namely electrodialyzed whey, fat blend, lactose and minerals. After all ingredients were added in proper proportion in each batch, the formula mixtures were heated to 165° F., homogenized, and sterilized at a temperature of 265° F. After sterilization, cans were examined for viscosity and physical characteristic. The following results were obtained:

| Skim Milk Preheat Condition | Viscosity, cps. | Physical Condition |
|---|---|---|
| (1) 190° F., about 5 seconds hold | (1) | Very grainy. |
| (2) 190° F., 30 second hold | 14.3 | Slight grain. |
| (3) 190° F., 2.5 minutes hold | 10.6 | Smooth. |
| (4) 190° F., 5.0 minutes hold | 6.9 | Do. |

[1] Not measurable.

The above results, combined with results listed in Example II and III, demonstrates the necessity of a preheat temperature of at least 190° F. for the non-fat milk.

EXAMPLE VI

Separated weighed portions of non-fat milk, warmed to about 150° F., were combined with the other formula ingredient, namely electrodialyzed whey, fat blend, lactose and minerals. Resulting temperature of each batch was about 130° F. Each of the identical batches were then passed through a high temperature short time heater of conventional design at temperatures ranging from 165° F. to 240° F. with time at temperature of about 15 seconds and each cooled to about 160–165° F., homogenized and sterilized at a temperature of 265° F. Cans were than examined for viscosity and physical condition. The results follows:

| Formula Mix Temperature | Viscosity, cps. | Physical Condition | Usability |
|---|---|---|---|
| 165° F | (1) | Coagulated | Negative. |
| 180° F | (1) | do | Do. |
| 190° F | 14.6 | Grainy | Do. |
| 200° F | 12.1 | do | Do. |
| 220° F | 7.5 | do | Do. |
| 240° F | 5.5 | Slight grain | Do. |

[1] Not measurable.

The above results show that even though viscosities of the sterilized formula were in a satisfactory range when the formula mix was heated to temperatures of 190 to 240° F., the resulting product was unsatisfactory due to graininess or sandy texture. In contrast to other milk products in which a slight graininess present at the time of manufacture tends to disappear in shelf life, any such graininess in the product of present interest is permanent and makes the product unacceptable to the user.

In preparing the compositions of the present invention in accordance with the method thereof it is to be understood that the liquid formula described to which the invention is limited, is normally prepared in a solids concentration that permits it to be diluted to the desired volume by the user. This volume will normally be such that as used, i.e., in diluted form, solids content will be substantially that of human milk normally in the range of about 12.4% solids. In so preparing the compositions the advantages in terms of volumes of liquid handled and shipped is obvious. It is therefore the practice in the present invention to have the solids concentration of the liquid processed in the range of from about 18% to about 28% by volume. At this solids concentration the processing condition specified are maintained without adverse effect on the product which is then ideally adapted for dilution to the desired volume by the user.

The data provided in the foregoing examples demonstrates the necessity of heating the non-fat milk portion of described formula separately and then combining with remaining formula ingredients rather than heating the non-fat milk component in conjunction with the other formula ingredients.

While the foregoing invention has been described with some degree of particularity in the specific examples set forth, it is to be understood that the invention is not to be limited thereby but is only to be limited by the claims appended hereto.

What is claimed is:

1. In the process of combining non-fat milk with electrodialyzed whey, lactose, a fat mixture and minerals to produce a liquid infant feeding formula, the improvement comprising heating the non-fat milk component to a temperature of from 190 to 215° F. prior to blending with other formula components, maintaining the non-fat milk component at this temperature for a period of time, said period of time being selected from a value within the lower time limit and upper time limit defined on the graph constituting FIGURE 1 of the drawing for a selected preheat temperature.

2. In the process of combining non-fat milk with electrodialyzed whey, lactose, a fat mixture and minerals to produce a liquid infant feeding formula, the improvement comprising pretreating the non-fat milk by heating the same to a temperature of from 190 to 215° F. prior to blending with other formula components, maintaining the non-fat milk component at this temperature for a period of time, said period of time being selected from a value within the lower time limit and upper time limit defined on the graph constituting FIGURE 1 of the drawing for a selected preheat temperature, and cooling the non-fat component.

3. In the process of combining non-fat milk with electrodialyzed whey, lactose, a fat mixture and minerals to produce a liquid infant feeding formula, the improvement comprising heating the non-fat milk prior to the addition of other ingredients to a temperature of from 190 to 215° F. prior to blending with other formula components, maintaining the non-fat milk component at this temperature for a period of time, said period of time being selected from a value within the lower time limit and upper time limit defined on the graph constituting FIGURE 1 of the drawing for a selected preheat temperature, cooling the non-fat milk component and mixing the same with the other formula components.

4. In the process of combining non-fat milk with electrodialyzed whey, lactose, a fat mixture and minerals to produce a liquid infant feeding formula, the improvement comprising heating the non-fat milk component to a temperature of from 190 to 215° F. prior to blending with other formula components, maintaining the non-fat milk component at this temperature for a period of time, said period of time being selected from a value within the lower time limit and upper time limit defined on the graph constituting FIGURE 1 of the drawing for a selected preheat temperature, cooling the non-fat milk to a temperature of at least 150° F. and spray drying the cooled non-fat milk.

5. In the process of combining non-fat milk with electrodialyzed whey, lactose, a fat mixture and minerals to produce a liquid infant feeding formula which is capable of being sterilized, the improvement comprising heating the non-fat component before blending with other components to a temperature of from 190 to 215° F., maintaining the non-fat milk component at this temperature for a period of time, said period of time being selected from a value within the lower time limit and upper time limit defined on the graph constituting FIGURE 1 of the drawing for a selected preheat temperature, cooling the non-fat milk to a temperature of at least 150° F., spray drying the cooled non-fat milk after heating and mixing the spray dried non-fat milk with the formula ingredients identified.

6. In the process of combining non-fat milk with electrodialyzed whey, lactose, a fat mixture and minerals to produce a liquid infant feeding formula, the improvement comprising pretreating the non-fat milk component by heating the same to a temperature of from 190 to 215° F., prior to blending with other formula ingredients, maintaining the non-fat milk component at this temperature for a period of time, said period of time being selected from a value within the lower time limit and upper time limit defined on the graph constituting FIGURE 1 of the drawing for a selected preheat temperature, cooling the non-fat milk to at least 150° F., spray drying the cooled non-fat milk, mixing the spray dried non-fat milk with the other formula ingredients, introducing the formula into cans, sealing the cans and heat sterilizing the cans.

7. In the process of combining non-fat milk with electrodialyzed whey, lactose, a fat mixture and minerals to produce a liquid infant feeding formula the improvement comprising heating the non-fat milk component to a temperature of about 190° F., prior to mixing the non-fat milk with other formula components, maintaining the non-fat milk at this temperature for a period of from about 3 minutes to not more than 10 minutes, cooling the non-fat milk component and mixing the same with the other formula components, introducing the formula into cans, sealing and heat sterilizing the cans at a temperature of between 240 and 300° F.

8. In the process of producing an infant liquid feed formula in which a non-fat milk component is combined with electrodialyzed whey, lactose, a fat mixture and minerals, the improvement comprising heating the non-fat milk, prior to mixing with the other ingredients, to a temperature of about 200° F., maintaining the non-fat milk at this temperature for a period of from about 10 second to not more than about 100 seconds, cooling the non-fat milk to a temperature of at least 150° F., and combining the non-fat milk with electrodialyzed whey, lactose and a blend of edible fats, introducing the mixture to cans, sealing said cans and sterilizing said cans at a temperature of about 280° F.

9. In the process of combining non-fat milk with electrodialyzed whey, lactose, a fat mixture and minerals to produce a liquid infant feeding formula, the improvement comprising heating the non-fat milk component to a temperature of about 210° F., prior to mixing the non-fat milk with other formula components, maintaining the non-fat milk at this temperature for a period of from about 0.5 second to about 10 seconds, cooling the non-fat milk component to a temperature of not more than about 150° F., and mixing the same with the other formula components, introducing the formula into cans, sealing and heat sterilizing the cans at a temperature of between 240 and 300° F.

10. In the process of combining non-fat milk with electrodialyzed whey, lactose, a fat mixture and minerals to produce a liquid infant feeding formula, the improvement comprising heating the non-fat milk component to a temperature of about 215° F., prior to mixing the non-fat milk with other formula components, maintaining the non-fat milk at this temperature for a period of about 1.0 second, cooling the non-fat milk component and mixing the same with the other formula components, introducing the formula into cans, sealing and heat sterilizing the cans.

No references cited.

A. LOUIS MONACELL, *Primary Examiner.*